United States Patent [19]

Dudley

[11] Patent Number: 4,999,526
[45] Date of Patent: Mar. 12, 1991

[54] APPARATUS FOR SYNCHRONIZING CLOCK SIGNALS

[75] Inventor: Neil F. Dudley, Middlesex, England

[73] Assignee: Crosfield Electronics Limited, London, United Kingdom

[21] Appl. No.: 384,384

[22] Filed: Jul. 25, 1989

[30] Foreign Application Priority Data

Aug. 5, 1988 [GB] United Kingdom ............... 8818665

[51] Int. Cl.⁵ .................... H03K 5/13; H03K 5/08; H03K 5/159; H03L 7/00
[52] U.S. Cl. ................................. 307/269; 331/1 A; 328/35
[58] Field of Search ............. 331/1 A; 328/56, 55; 307/269; 377/47

[56] References Cited

U.S. PATENT DOCUMENTS

| 3,577,128 | 5/1971 | Criscimagna | 328/55 |
| 3,760,280 | 9/1973 | Covington | 328/56 |
| 4,316,148 | 2/1982 | Kaminski | 328/55 |
| 4,600,895 | 7/1986 | Landsman | 331/1 A |
| 4,851,709 | 7/1989 | Bailey | 328/35 |

FOREIGN PATENT DOCUMENTS 2360450  6/1975  Fed. Rep. of Germany..

Primary Examiner—Stanley D. Miller
Assistant Examiner—Nam T. Nguyen
Attorney, Agent, or Firm—Sughrue, Mion, Zinn, Macpeak & Seas

[57] ABSTRACT

Apparatus for synchronizing a clock signal to a pulse comprises a clock signal generator (1) for generating a first clock signal having a frequency equal to that of a desired clock signal. A delay circuit (2) to which the first clock signal is fed generates a number of time delayed versions of the first clock signal, each time delay being less than the period of the first clock signals. Logic (9) compares the time delayed versions of the first clock signal and the original clock signal at the time of occurrence of the pulse and selects as the desired clock signal, a version of the first clock signal which has changed state close to the time of occurence of the pulse.

2 Claims, 3 Drawing Sheets

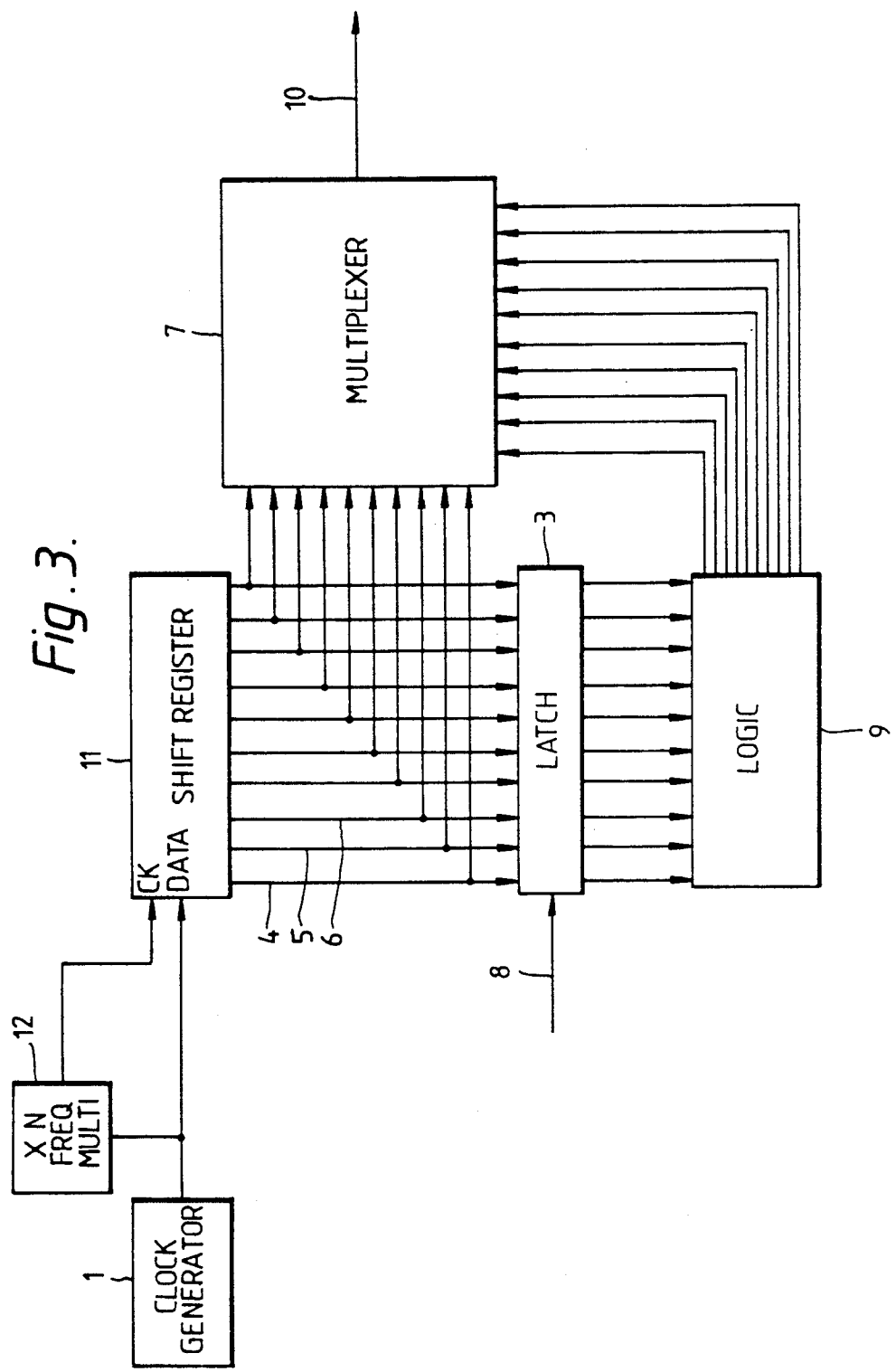

APPARATUS FOR SYNCHRONIZING CLOCK SIGNALS

FIELD OF THE INVENTION

The invention relates to methods and apparatus for synchronising a clock signal to a pulse.

THE DESCRIPTION OF THE PRIOR ART

There is a common requirement to generate a clock signal which is synchronised to a pulse, particularly a regular pulse stream. In the past, this has been achieved by feeding a high frequency clock signal to a counter, such as a divide-by-four counter which outputs a final clock signal at a lower frequency. The pulse is sent as a reset pulse to the counter so that on each occurrence of the reset pulse, the counter is reset and the output clock signal is then synchronised to the reset pulse. This approach has two disadvantages. Firstly, it only allows the output clock signal to be synchronised within the accuracy of the ratio of the input and output clock signals ($\frac{1}{4}$ in the case of the divide-by-four counter mentioned above), and secondly it requires the initial clock frequency to be a multiple of the actual output clock frequency required. This latter requirement is a problem because it is generally necessary to provide a circuit to multiply an original clock frequency to generate the high frequency version and this circuit is liable to introduce phase jitter as the multiplication factor is increased. This is a particular problem at high clock speeds where the ratio of the input and output clock speeds is high to produce greater accuracy.

SUMMARY OF THE INVENTION

In accordance with one aspect of the present invention, a method of synchronising a clock signal to a pulse comprises providing a first clock signal having a frequency equal to that of a desired clock signal; generating a number of time delayed versions of the first clock signal, each time delay being less than the period of the first clock signal; comparing the time related versions of the first clock signal and the original clock signal at the time of occurrence of the pulse; and selecting as the desired clock signal, a version of the first clock signal which has changed state close to the time of occurrence of the pulse.

In accordance with a second aspect of the present invention, apparatus for synchronising a clock signal to a pulse comprises a clock signal generator for generating a first clock signal having a frequency equal to that of a desired clock signal; delay means to which the first clock signal is fed for generating a number of time delayed versions of the first clock signal, each time delay being less than the period of the first clock signal; and comparison means for comparing the time delayed versions of the first clock signal and the original clock signal at the time of occurrence of the pulse and for selecting as the desired clock signal, a version of the first clock signal which has changed state close to the time of occurrence of the pulse.

In contrast to the previous methods of clock signal synchronisation, this invention enables a lower frequency clock generator to be used thus reducing the problems of phase jitter mentioned above. In addition, a higher degree of accuracy can be achieved by selecting a delay element with a shorter time delay provided there are sufficient delay elements so that the total delay through all of the elements is at least one clock period.

Each time delay typically has the same duration (although this is not essential) and is less than a fraction of the period of the first clock signal where the fraction is equal to or less than the accuracy with which it is desired to synchronise the clock signal to the pulse.

In one example, the delay means comprises a number of delay circuits arranged in series, each imparting a respective time delay on the incoming clock signal received from the upstream delay circuit. In the preferred example, the delay means comprises a tapped delay line, for example fabricated from TTL logic each time delayed version of the first clock signal being fed in parallel to the comparison means.

In another example, the delay means comprises a shift register having a serial input port connected to the clock signal generator, and means for generating a second clock signal having a frequency higher than the first clock signal for controlling the shift rate of the shift register, wherein each of the parallel output ports of the shift register is connected to the comparison means to provide the different versions of the first clock signal. Typically, the second clock signal generating means comprises a frequency multiplier to which the first clock signal is also fed.

Typically, the comparison means comprises a latch to which each time delayed version of the first clock signal is fed; a multiplexer to which each time delayed version of the first clock signal is fed; and logic means, the latch being responsive to the pulse to enable the logic means to compare the contents of the latch at the time of the pulse and to select the time delayed version of the first clock signal which changes state closest to the pulse, the logic means controlling the multiplexer to output the selected version of the first clock signal.

The method is particularly suited for synchronising a clock signal to a regular pulse, the steps of the method being repeated upon each occurrence of a pulse.

One important application of the invention is in the field of raster image output scanning in which the position of the recording beam on a record medium needs accurately controlled. In this case, each clock pulse will typically correspond to a single image pixel.

BRIEF DESCRIPTION OF THE DRAWINGS

Two examples of apparatus and methods according to the invention will now be described with reference to the accompanying drawings, in which.

DETAILED DESCRIPTION OF THE EMBODIMENTS

Figure 1:
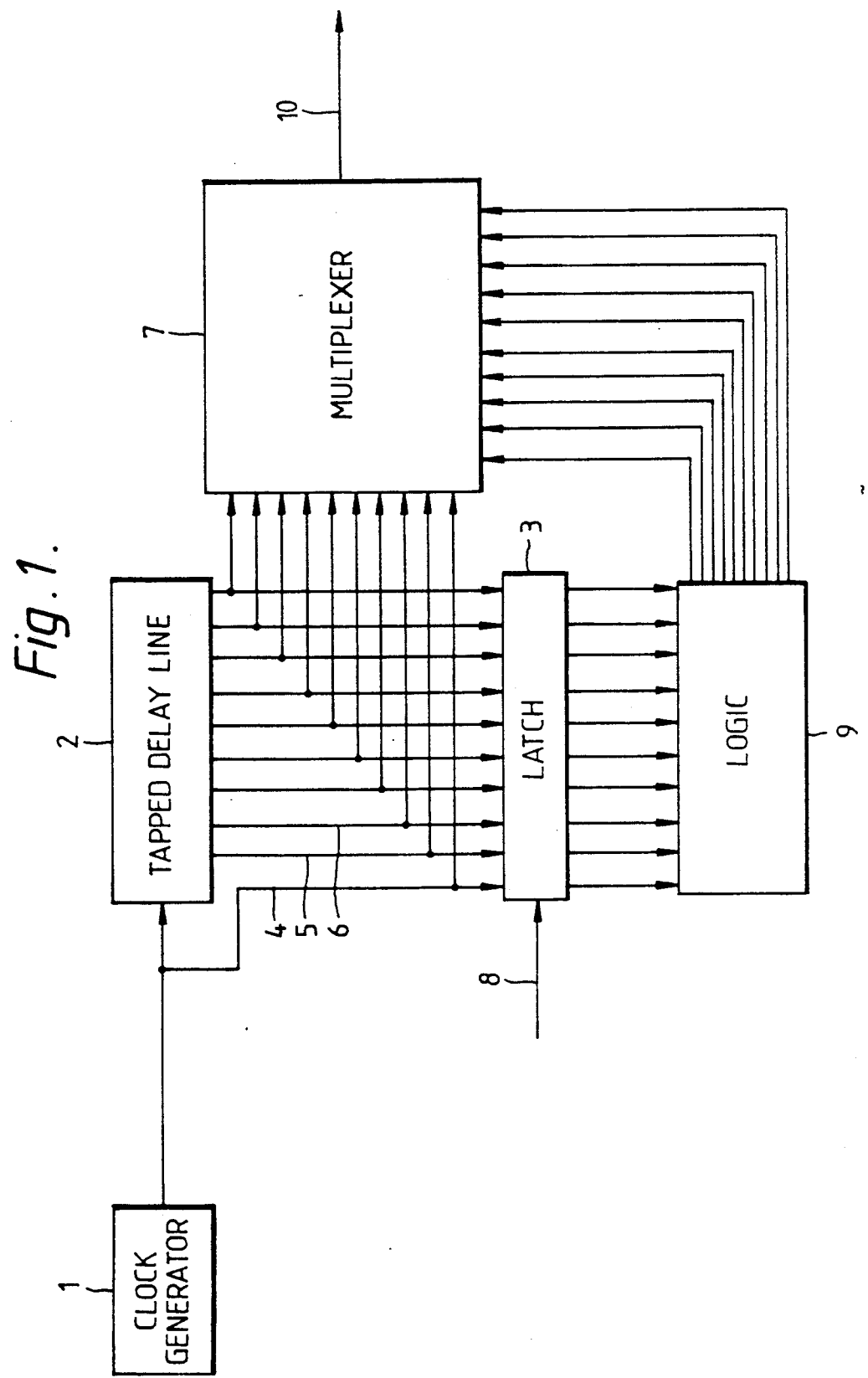
FIG. 1 is a block diagram of a first example of the apparatus.
Figure 2:
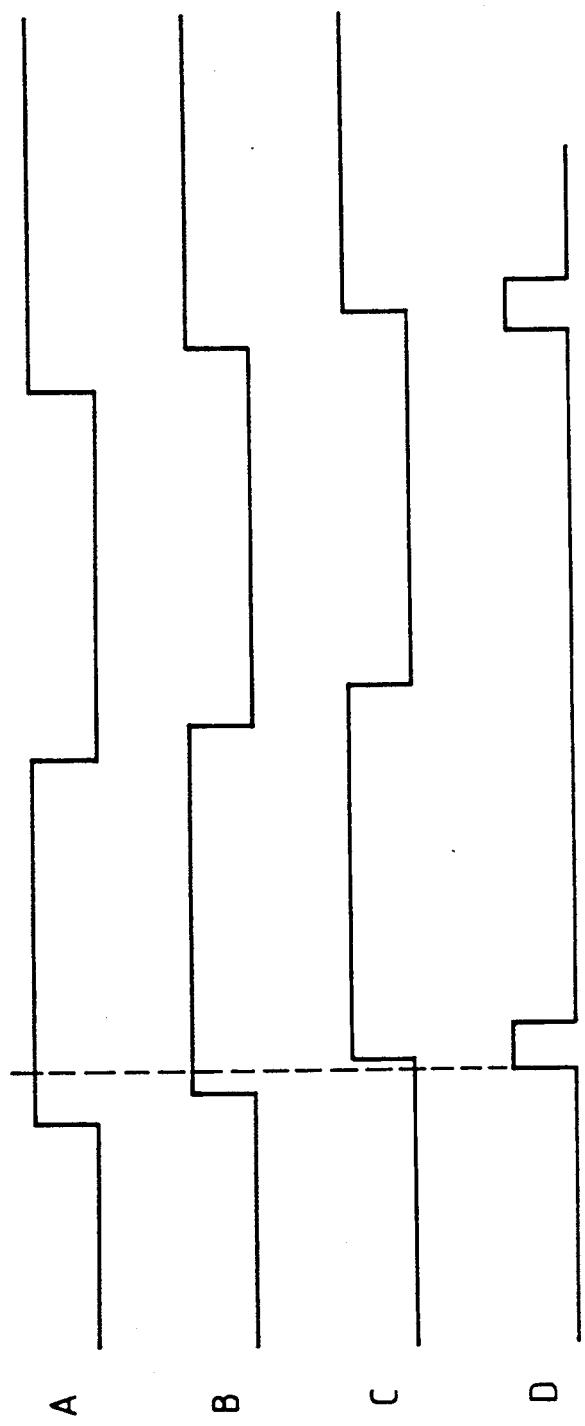
FIG. 2 is a pulse diagram illustrating operation of the apparatus shown in FIG. 1; and, FIG. 3 is a block diagram of a second example of the apparatus.

The apparatus shown in FIG. 1 comprise a clock generator 1 for generating a first clock signal having a fixed frequency as shown in FIG. 2A. This clock signal is fed to a tapped delay line 2 which may be provided by a Newport Microtex 50450. Alternatively, a series of integrated circuit logic elements could be used as delay components. In this simple example, nine different time delays are imparted to the original clock signal, each time delay being greater than 1/10 of the clock period. The original clock signal together with each time delayed version is fed along a respective output line to a latch 3. The first two delayed versions of the clock signal are illustrated in FIGS. 2B and 2C respectively and the signals shown in FIGS. 2A-2C are fed to the latch 3 via lines 4-6 respectively. In addition, the original clock signal and the time delayed versions are fed in parallel to multiplexer 7.

In practice, the clock frequency could be in the order of 20 MHz, and a large number of time delayed versions will be generated with each time delay being 5 nanoseconds.

The latch 3 is actuated by a synchronisation pulse fed to the latch along a line 8. This synchronisation pulse may be generated in a variety of ways but in the case of image scanning apparatus which makes use of a rotating drum, may be generated by sensing each complete rotation of the drum in a conventional manner. The synchronisation pulse is illustrated in FIG. 2D. Upon the receipt of the synchronisation pulse, the latch 3 latches the current states of each of the signals fed to it from the tapped delay line 2 as a series of 1 or 0 values. For example, if the pulse occurs at the point shown in FIG. 2D, the first two locations in the latch 3 will contain binary 1 while the remainder will contain binary 0.

The contents of the latch 3 are fed to a logic circuit 9 which determines where there is a transition in the binary values from binary 1 to binary 0. The logic circuit 9 selects one of the versions of the clock signal on each side of the transition. The logic circuit 9 cannot determine which version of the clock signal adjacent to the transition is closest to the pulse in time but the circuit 9 will be pre-programmed to select either the version corresponding to the location of the latch with binary 1 or that corresponding to the location in the latch with binary 0.

The decision made by the logic circuit 9 is conveyed to the multiplexer 7 by one of the set of 10 output lines, the output line corresponding to the selected version of the delayed clock signal carrying a binary 1 signal while the remainder carry binary 0 signals. The multiplexer 7 responds to the single line carrying a binary 1 to switch the appropriate version of the clock signal from one of the input lines to the output line 10 so as to constitute the final output clock signal.

At each occurrence of the synchronisation pulse, new information will be latched into the latch 3 and the process will be repeated.

FIG. 3 illustrates a modified form of the apparatus shown in FIG. 1 in which the tapped delay line 2 is replaced by a shift register 11 having a serial data input which is coupled with the clock generator 1. The shift register 11 is clocked by a clock signal derived from a xN frequency multiplier 12 to which the clock signal from the clock generator 1 is also fed. In one example, N = 10. The shift register 11 is of a conventional form so that if it is clocked at a frequency of 10 times the original clock frequency, it will contain within it a set of five binary "0" and five binary "1" corresponding to a single clock period. Thus, on the parallel output ports of the shift register 11 which are connected in parallel to the latch 3 different time delayed versions of the original clock signal will appear. The operation of the remainder of the apparatus shown in FIG. 3 is exactly as in the FIG. 1 example. We will now consider briefly the advantage of the FIG. 3 example over a conventional arrangement.

Consider a typical clock rate of 20 Mhz with a requirement to synchronise the clock to the pulse within 1/10th of the clock period. In order to do this conventionally it would require a frequency multiplier which would multiply the 20 Mhz clock to 200 Mhz and subsequently use a divide by 10 counter in order to synchronise the pulse within 1/10th. If the frequency were to jitter at the output of the frequency multiplier by say 1% (this is much more than might be expected in practice) then at times the clock may be 1% fast ie. a frequency of 201 Mhz and at other times a frequency of 1% slow ie. 199 Mhz. Having divided the clock by a factor of 10 in the synchronising divider there would still be an error of 1% on the rate at which the pixels were laid down onto the film medium (assuming that the device was being used in a scanning application) and this would lead to severe dislocation of the raster pattern making the resultant image unusable.

However, consider now the case of the pulse synchroniser, where the delay is provided by the shift register 11 with the input signal being the original clock signal ie. 20 Mhz and the shift signal being the original clock multiplied by 10 with a 1% jitter on it as before. We now see that the clock read out speed remains correct, however, the phasing of the start of each clock pulse may vary by 1% of its correct position. As the aim is to synchronise the clock to the pulse to within 10% of the clock period the result of the 1% jitter on the 200 Mhz would be that the time delay equivalent given by the shift register could vary by 1% from their nominal positions of 10% of the 20 Mhz period, that is the precise positions of each time delayed version of the 20 Mhz clock pulse could vary by 0.1% of the period of the 20 Mhz clock introduces 1% jitter the dislocation of pixel position is now substantially reduced.

In the case where the clock frequency of 20 Mhz after leaving the synchronising divider has a 1% jitter on it then the position of the trailing pixel of a 600 mm long line could be displaced by up to 6 mm from its neighbouring line (the pulse synchronisation only ensures that adjacent lines start next to one another. The finishing position is dependent on the clock and the linear position of the spot over the recording material). However in the case where the new method of pulse synchronisation is used each stage of the shift register by virtue of having a 200 Mhz nominal clock would introduce a delay of approximately 5 nano seconds with a tolerance of 50 pico seconds.

Therefore assuming that the 20 Mhz clock signal is absolutely stable and the writing speed constant the last pixel of each line using the new synchronisation circuit would be laid down in the correct position but with a position error of 10% ± 0.1% (due to the jitter) of its correct position. The last pixel in each line would then differ in position from its neighbour not by 6 mm but typically by 15 microns or so which is truly negligible and very probably unmeasurable. Thus in this instance phase jitter in the 200 Mhz oscillator has been reduced from an intolerable to an insignificant problem.

Finally, it should be noted that provided the total delay through the delay element (delay line 2 or shift register 11) is greater than the period of the clock signal, these circuits can be used to phase synchronise clocks of varying periods.

I claim:

1. Apparatus for synchronising a clock signal to a pulse, the apparatus comprising:
    a clock signal generator for generating a first clock signal having a frequency equal to that of a desired clock signal;

a shift register having a serial input port connected to said clock signal generator and a number of parallel output ports, for generating a number of time delayed versions of said first clock signal, each said time delay being less than the period of said first clock signal;

comparison means for comparing said time delayed versions of said first clock signal and said original clock signal at the time of occurrence of said pulse and for selecting as said desired clock signal, a version of said first clock signal which has changed state close to the time of occurrence of said pulse; and frequency multiplier means, receiving said first clock signal, for generating a second clock signal having a frequency higher than said first clock signal, said second clock signal controlling the shift rate of said shift register, wherein each of said parallel output ports of said shift register is connected to said comparison means to provide said time delayed versions of said first clock signal.

2. Apparatus according to claim 1, wherein said comparison means comprises a latch to which each time delayed version of said first clock signal is fed; a multiplexer to which each time delayed version of said first clock signal is fed; and logic means, said latch being responsive to the pulse to enable said logic means to compare the contents of said latch at the time of said pulse and to select said time delayed version of said first clock signal which changes state closest to said pulse, said logic means controlling said multiplexer to output the selected version of said first clock signal.

* * * * *